UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

TETRABROMO DERIVATIVE OF INDIGO AND PROCESS OF MAKING SAME.

No. 856,776.  Specification of Letters Patent.  Patented June 11, 1907.

Application filed March 23, 1907. Serial No. 364,020.

*To all whom it may concern:*

Be it known that I, GADIENT ENGI, doctor of philosophy and chemist, a citizen of the Swiss Republic, and a resident of Basel, Switzerland, have invented new and useful Tetrabromo Derivatives of Indigo and a Process of Making the Same, of which the following is a full and exact specification.

Hitherto tetrabromo derivatives of indigo are not known. I have found that such tetrabromo substitution products of indigo are produced in an extremely smooth manner and with substantially quantitative yield by treating indigo or its mono- and di-bromo derivatives with suitable proportions of bromin at a raised temperature in presence of appropriate solvents or of appropriate media in which the material may be suspended. The new tetrabromo derivatives of indigo thus obtained are extremely valuable dyestuffs on account of their tinctorial properties, for they can be easily made into vats by the usual methods and dye cotton without a mordant clear blue tints, which are considerably more vivid and of a greener shade than the tints obtained by means of indigo or its known mono- or di-bromo derivatives; moreover, as composed with the latter, they are considerably faster to washing and chlorin.

The manufacture of these new tetrabromo derivatives of indigo is illustrated by the following examples.

Example I. 5 parts of indigo, 50 parts of nitro-benzene and 16—18 parts of commercial bromin are heated together in a reflux apparatus in an oil bath, the temperature of the latter being raised to 225° C. in the course of 1½ hours and the mixture being kept in gentle ebullition for a further 1½ hours. After cooling the mass the brominated product which separates in the form of voluminous, violet little crystals, is filtered, washed with alcohol and dried. The dyestuff thus obtained is a tetrabromo-derivative ($C_{16}H_6O_2N_2Br_4$). It dissolves in concentrated sulfuric acid with a deep blue coloration and in fuming sulfuric acid containing 24 per cent. $SO_3$ with a greenish blue coloration becoming pure blue on heating. On pouring this latter solution into ice-water bluish-green flocks separate. It is hardly soluble in cold anilin and cold nitrobenzene and very sparingly soluble in hot anilin with a deep blue coloration and in hot nitrobenzene with blue violet coloration. It is insoluble in water and scarcely soluble in chloroform. By treatment with the usual vat media it yields a bright yellow vat, in which unmordanted cotton is dyed fast clear greenish-blue tints increasing in brightness and fastness to chlorin when subjected to a short soaping or a short treatment with a solution of sodium carbonate at 60° C.

Example II. A mixture of 5 parts of indigo, 50 parts of nitrobenzene and 16 parts of bromin is allowed to stand for 24 hours at the ordinary temperature and then heated in a reflux apparatus in an oil bath for 3—4 hours, the temperature of the bath being 130—135° C. After cooling, the mass is filtered and the solid matter is washed with alcohol and dried. The dyestuff obtained in this manner forms bluish-violet small crystals and has the composition of a tetrabrom-indigo. ($C_{16}H_6O_2N_2Br_4$). Apart from small differences in the solubility in various solvents as well as in the colors of the solutions, it differs from the tetrabrom-indigo obtained according to Example I by the dyeings on cotton which are considerably more reddish and more vivid than those obtained by means of the dyestuff made according to Example I. The brightness and density of the dyeings are also increased by soaping them or treating them with a solution of sodium carbonate.

Instead of brominating indigo itself, the manufacture of bromindigo may also be effected by further brominating the mono- or dibromo-substitution products made by the known processes or the tribromo-substitution products obtained according to my application for Letters Patent executed at the same date as the present one.

Example III. 4 parts of dibromindigo, made for example by brominating indigo in glacial acetic acid in the known manner, are suspended in 40—50 parts of nitrobenzene, 4—5 parts of bromin added and the mixture is heated for 3—4 hours in a reflux apparatus so that it boils gently. After cooling, the separated product of the reaction is filtered and washed with alcohol. The tetrabromindigo possesses properties similar to those of the tetrabromo derivatives obtained according to Examples I and II.

What I claim is:

1. The described process for the manufacture of tetrabromo derivatives of indigo by heating indigo, mono-, di- and tribromindigo with bromin, in the presence of a suitable indifferent medium.

2. The described process for the manufacture of tetrabromo derivatives of indigo by heating indigo, mono-, di- and tribromindigo with bromin, in the presence of nitrobenzene.

3. As new products the tetrabromo derivatives of indigo corresponding to the general formula $C_{16}H_6O_2N_2Br_4$, constituting in dry state from blue to blue-violet powders, insoluble in water, scarcely soluble in chloroform, cold anilin and cold nitrobenzene, difficultly soluble in hot anilin and hot nitrobenzene with blue to blue-violet color, dissolving in concentrated sulfuric acid with deep blue color and yielding by treatment with alkaline reducing agents a light-yellow colored vat, from which unmordanted cotton is dyed pure blue shades, fast to washing, light and chlorin.

In witness whereof I have hereunto signed my name this 2 day of March 1907, in the presence of two subscribing witnesses.

GADIENT ENGI.

Witnesses:
GEO. GIFFORD,
AMAND BRAUN.